United States Patent
Kim et al.

(10) Patent No.: US 9,002,132 B2
(45) Date of Patent: Apr. 7, 2015

(54) DEPTH IMAGE NOISE REMOVAL APPARATUS AND METHOD BASED ON CAMERA POSE

(71) Applicant: Korea Institute of Science and Technology, Seoul (KR)

(72) Inventors: Jinwook Kim, Seoul (KR); Seungpyo Hong, Yongin-si (KR)

(73) Assignee: Korea Insitute of Science and Technology, Seoul (KR)

( * ) Notice: Subject to any disclaimer, the term of this patent is extended or adjusted under 35 U.S.C. 154(b) by 81 days.

(21) Appl. No.: 13/746,808

(22) Filed: Jan. 22, 2013

(65) Prior Publication Data

US 2014/0147056 A1    May 29, 2014

(30) Foreign Application Priority Data

Nov. 29, 2012    (KR) .......................... 10-2012-0136849

(51) Int. Cl.
*G06K 9/40* (2006.01)
*G06T 5/00* (2006.01)

(52) U.S. Cl.
CPC ..................................... *G06T 5/002* (2013.01)

(58) Field of Classification Search
None
See application file for complete search history.

(56) References Cited

U.S. PATENT DOCUMENTS

| 8,717,414 B2 * | 5/2014 | Kang et al. ...................... 348/42 |
| 2010/0183236 A1 | 7/2010 | Kang et al. |
| 2010/0195898 A1 | 8/2010 | Bang et al. |

FOREIGN PATENT DOCUMENTS

| JP | 2008-8797 A | 1/2008 |
| KR | 10-2008-0085655 | 9/2008 |
| KR | 10-2009-0049322 | 5/2009 |
| KR | 10-2010-0085675 A | 7/2010 |
| KR | 10-2010-0087685 A | 8/2010 |

\* cited by examiner

*Primary Examiner* — Bhavesh Mehta
*Assistant Examiner* — Feng Niu
(74) *Attorney, Agent, or Firm* — NSIP Law

(57) ABSTRACT

Disclosed are a depth image noise removal apparatus based on a camera pose, which includes: a depth image obtaining unit for obtaining a plurality of depth images; a camera pose converting unit for converting camera poses of the plurality of depth images into a camera pose of a reference depth image; and a depth image filtering unit for filtering the reference depth image by using a weighted average of each pixel of the reference depth image, and a method using this apparatus.

17 Claims, 6 Drawing Sheets

DEPTH IMAGE NOISE REMOVAL APPARATUS AND METHOD BASED ON CAMERA POSE

CROSS-REFERENCE TO RELATED APPLICATION

This application claims priority to Korean Patent Application No. 10-2012-0136849, filed on Nov. 29, 2012, and all the benefits accruing therefrom under 35 U.S.C. §119, the contents of which in its entirety are herein incorporated by reference.

BACKGROUND

1. Field

Embodiments of the present disclosure relate to noise removal of a depth image, and more particularly, to a noise removal apparatus and method of a depth image based on a camera pose.

2. Description of the Related Art

Recently, an image composing method using a depth image is widely used for reproducing a 3-dimensional image. Various kinds of cameras for photographing such depth images have been developed and commercialized, but they have many problems such as a lot of noise. Generally, a bilateral filter may be used for removing noise of a depth image. The bilateral filter adds a range weight to a Gaussian blur to preserve edge portions and blur the other regions. Therefore, as an improvement, a trilateral filtering method has been introduced. The trilateral filtering method adjusts angle and width of a filtering window according to a gradient of a pixel.

However, the above filters adopt a filtering method employed in an existing color image processing technique and are somewhat insufficient for removing noise of a depth image.

SUMMARY

The present disclosure is directed to providing an apparatus and method for innovatively removing noise of a depth image by using a camera pose of the depth image.

In one aspect, there is provided a depth image noise removal apparatus based on a camera pose, which includes: a depth image obtaining unit for obtaining a plurality of depth images; a camera pose converting unit for converting camera poses of the plurality of depth images into a camera pose of a reference depth image; and a depth image filtering unit for filtering the reference depth image by using a weighted average of each pixel of the reference depth image.

The depth image filtering unit may determine the weighted average based on a difference value of depth values and a distance value between each pixel of the reference depth image and each pixel of another depth image; and a difference value of camera poses for the plurality of depth images.

The camera pose converting unit may perform obtaining relative camera pose values of the plurality of depth images based on the reference depth image; and re-projecting the plurality of depth images to the reference depth image by calculating a re-projection matrix to the relative camera pose value.

The camera pose converting unit may obtain the relative camera pose value by using an ICP algorithm.

The depth image filtering unit may calculate a difference value of the camera pose by log-mapping the relative camera pose value.

The depth image filtering unit may perform successively generating a filtering window for a partial region of the reference depth image; and calculating the weighted average from the filtering window.

In another aspect, there is provided a depth image noise removal method based on a camera pose, which includes: obtaining a plurality of depth images; converting camera poses of the plurality of depth images into a camera pose of a reference depth image; and filtering the reference depth image by using a weighted average of each pixel of the reference depth image.

The weighted average may be determined based on a difference value of depth values and a distance value between each pixel of the reference depth image and each pixel of another depth image; and a difference value of camera poses for the plurality of depth images.

Operation of converting camera poses of the plurality of depth images into a camera pose of a reference depth image may include obtaining relative camera pose values of the plurality of depth images based on the reference depth image; and re-projecting the plurality of depth images to the reference depth image by calculating a re-projection matrix to the relative camera pose value.

Operation of obtaining relative camera pose values may obtain the relative camera pose value by using an ICP algorithm.

The difference value of the camera pose may be calculated by log-mapping the relative camera pose value.

Operation of filtering the reference depth image may include successively generating a filtering window for a partial region of the reference depth image; and calculating the weighted average from the filtering window.

According to the present disclosure, since depth images are successively photographed and a relative camera pose is checked, several depth images may be converted into the same viewpoint and blended, thereby effectively removing a lot of noise.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Hereinafter, embodiments of the present disclosure will be described in detail with reference to the accompanying drawings.

Figure 1:
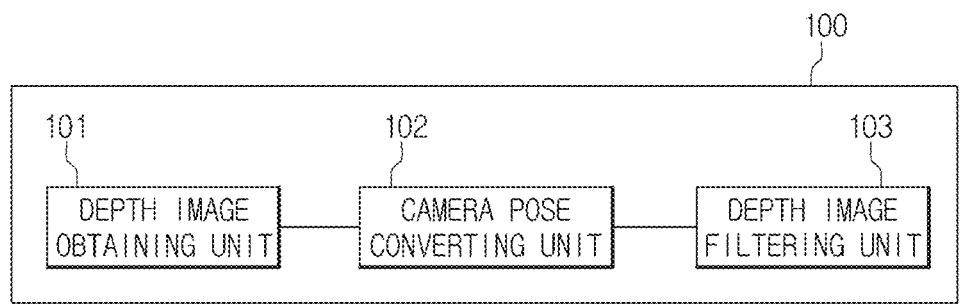
FIG. 1 is a diagram showing a depth image noise removal apparatus based on a camera pose according to an embodiment of the present disclosure.

FIG. 1 is a diagram showing a depth image noise removal apparatus based on a camera pose according to an embodiment of the present disclosure. Referring to FIG. 1, the depth image noise removal apparatus 100 based on a camera pose according to this embodiment may be configured to include a depth image obtaining unit 101, a camera pose converting unit 102, and a depth image filtering unit 103.

In an embodiment, the depth image obtaining unit 101 may include a camera capable of photographing a plurality of depth images and building a database. The depth image obtaining unit 101 may be a combination of at least one color camera and depth camera or may also be composed of only depth cameras. In addition, the depth camera may employ a depth camera using an infrared sensor (time of flight camera). However, in the present disclosure, the camera for obtaining a depth image is not limited to the above and may include any device capable of obtaining a depth image.

In an embodiment, the depth image obtaining unit 101 may photograph a plurality of depth images, convert the images into electronic data, and transfer the data to the camera pose converting unit 102.

The camera pose converting unit 102 may convert camera poses of a plurality of depth images transferred from the depth image obtaining unit 101 into a camera pose of a specific depth image. Here, the specific depth image may be any one depth image selected from the plurality of depth images transferred from the depth image obtaining unit 101. In the specification, the specific depth image is called a reference depth image. In other words, the camera pose converting unit 102 may match camera poses of a plurality of depth images with a camera pose of a reference depth image. In addition, in the present disclosure, the reference depth image may be a frame subject to noise removal.

Figure 2:
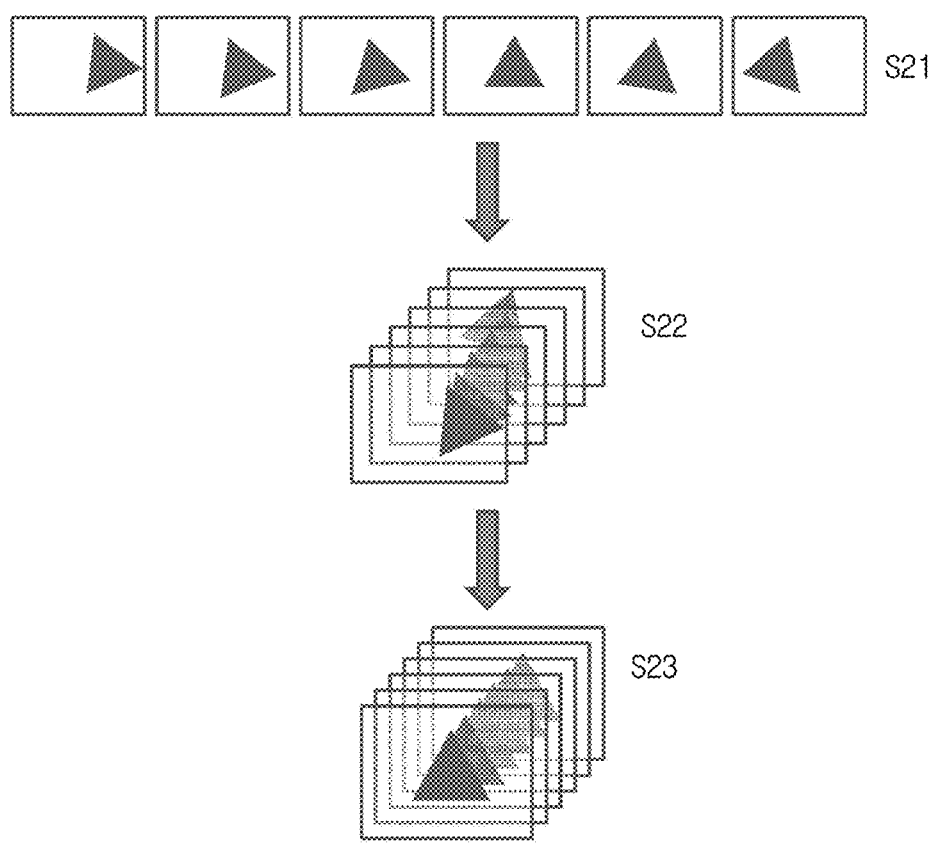
FIG. 2 is a flowchart for illustrating a process for a camera pose converting unit to convert a camera pose for a plurality of depth images according to an embodiment of the present disclosure.

FIG. 2 is a flowchart for illustrating a process for a camera pose converting unit to convert a camera pose for a plurality of depth images according to an embodiment of the present disclosure.

Referring to FIG. 2, the camera pose converting unit 102 may obtain a camera pose of each depth image from six depth images transferred from the depth image obtaining unit 101 (S22). Even though the present disclosure is illustrated based on six successive depth images as shown in FIG. 2, the present disclosure is not limited to the number of depth images, and the number of depth images obtained may be different. After that, the camera pose converting unit 102 may re-project a camera pose of another depth images to the reference depth image (S23).

In other words, when obtaining a camera pose of each depth image, the camera pose converting unit 102 obtains relative camera pose values for a plurality of depth images based on the reference depth image. After that, the camera pose converting unit 102 calculates a re-projection matrix to the relative camera pose value so that the plurality of depth images may be re-projected according to the reference depth image. In addition, the camera pose converting unit 102 may obtain the relative camera pose value by using a point-to-plane Iterative Closest Point (ICP) algorithm.

In an embodiment of the present disclosure, the depth image filtering unit 103 may filter the reference depth image by using a weighted average of each pixel of the reference depth image. Here, the depth image filtering unit 103 may successively generate filtering windows with respect to the reference depth image subject to noise removal, and calculate an weighted average among the filtering windows. The filtering windows may be generated for one portion of the reference depth image and then successively generated for all regions of the reference depth image so that the entire reference depth image may be filtered. However, the filtering window may also be generated for a plurality of depth images other than the reference depth image.

Figure 3:
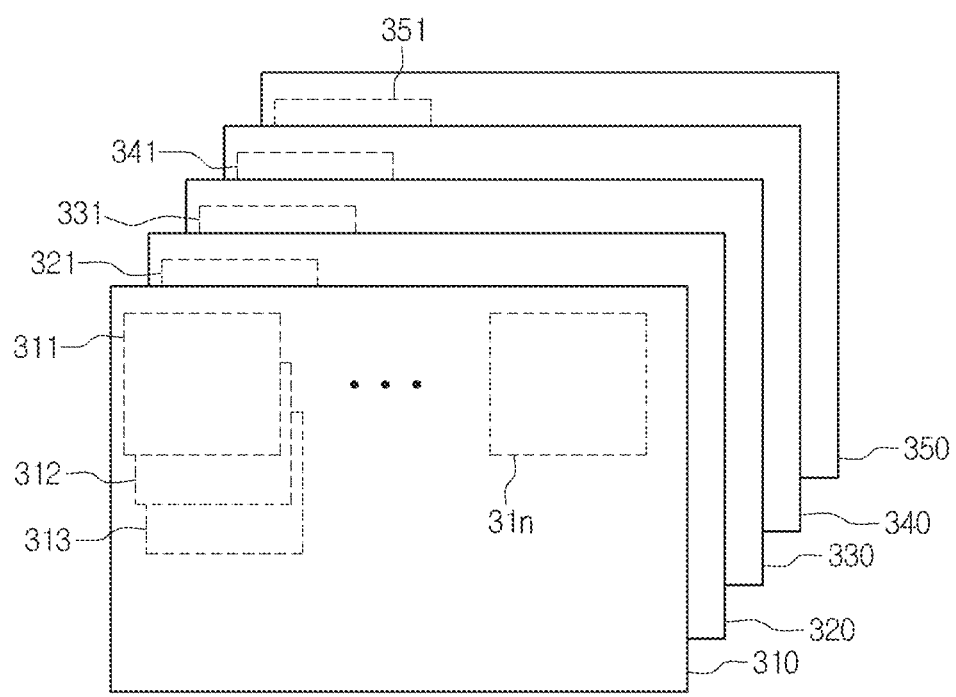
FIG. 3 is a diagram for illustrating the concept of a plurality of depth images where filtering windows are generated.

FIG. 3 is a diagram for illustrating the concept of a plurality of depth images where filtering windows are generated. Referring to FIG. 3, a plurality of depth images where camera poses are aligned is depicted. A filtering window is generated for a portion of the depth image, and the depth image filtering unit 103 may filter the filtering window. In addition, the depth image filtering unit 103 may successively generate filtering windows such as a first filtering window 311, a second filtering window 312 and a third filtering window 313 and successively perform local filtering thereto with respect to the reference depth image 310. In this filtering process, information of pixels of other depth images (for example, depth images 320, 330, 340) may be used.

The depth image filtering unit 103 according to an embodiment of the present disclosure may determine a weighted average based on (a) a difference value of depth values between each pixel of the reference depth image and each pixel of another depth image, (b) a distance value between each pixel of the reference depth image and each pixel of another depth image, and (c) a difference value of camera poses for the plurality of depth images.

In other words, the depth image filtering unit 103 may obtain a filtered value with respect to a pixel (p) of the reference depth image (k) according to Equation 1 below.

$$f(I_p^k) = \frac{1}{w_p^k} \sum_{i \in C} \sum_{q \in S} G_{\sigma_s}(\|p-q\|) G_{\sigma_r}(|I_p^k - I_q^i|) G_{\sigma_c}(\|\log(T_{ki})\|) I_q^i \quad \text{Equation 1}$$

Here, k represents a reference depth image, and I represents depth images other than the reference depth image. In addition, $w_p^k$ represents a sum of all weights in the corresponding window, and $I_q^i$ represents a depth value of a pixel q of the depth image i. In addition, details of $G_{\sigma_s}(\|p-q\|)$, $G_{\sigma_r}(|I_p^k - I_q^i|)$, $G_{\sigma_c}(\|\log(T_{ki})\|)$ are represented in detail in Equations 2 to 4 below.

$$G_{\sigma_s}(\|p-q\|) = e^{-\frac{1}{2}\left(\frac{\|p-q\|}{\sigma_s}\right)^2} \quad \text{Equation 2}$$

$$G_{\sigma_r}(|I_p^k - I_q^i|) = e^{-\frac{1}{2}\left(\frac{|I_p^k - I_q^i|}{\sigma_r}\right)^2} \quad \text{Equation 3}$$

$$G_{\sigma_c}(\|\log(T_{ki})\|) = e^{-\frac{1}{2}\left(\frac{\|\log(T_{ki})\|}{\sigma_c}\right)^2} \quad \text{Equation 4}$$

Here, $T_{ki}$ represents a relative camera pose value between two depth images. Here, in order to obtain the size of $T_{ki}$, a norm obtained by log-mapping may be calculated.

Figure 4:
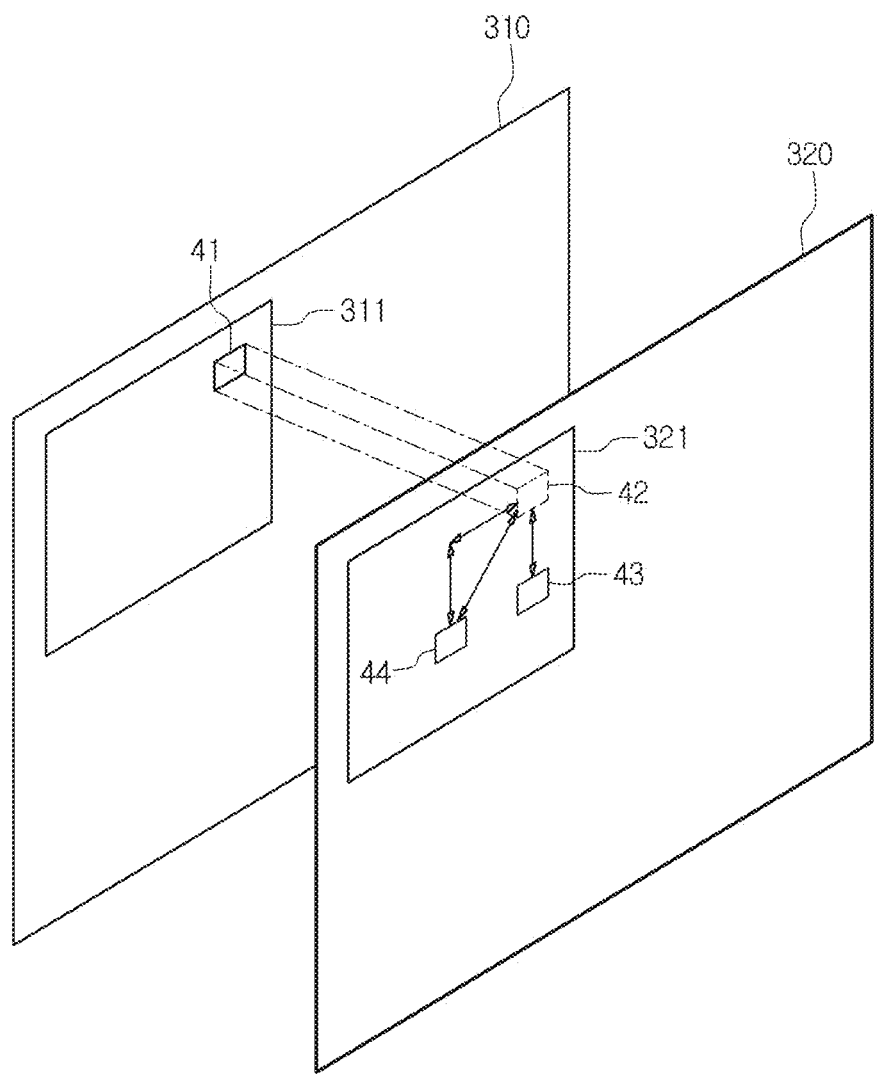
FIG. 4 is a diagram for illustrating a comparative pixel by which a depth image filtering unit calculates a distance and a depth value between each pixel of a reference depth image and each pixel of another depth image according to an embodiment of the present disclosure.

FIG. 4 is a diagram for illustrating a comparative pixel by which a depth image filtering unit calculates a distance and a depth value between each pixel of a reference depth image and each pixel of another depth image according to an embodiment of the present disclosure. Referring to FIG. 4, a filtering window 311 for the reference depth image and a filtering window 321 for another successive depth image are depicted. A filtering process for a pixel 41 of a filtering reference depth image will be described. In detail, the depth image filtering unit 103 performs a filtering process described later with respect to each pixel in the filtering window. In addition, since the filtering window is generated for the entire area of the reference depth image as described above, it will be understood that the following filtering process is performed to all pixels of the reference depth image.

In an embodiment, the depth image filtering unit 103 may calculate a difference value (a) of depth values between each pixel of the reference depth image and each pixel of another depth image. For example, the depth image filtering unit may determine the difference value by comparing the depth value of the pixel 41 with depth values of all pixels in the filtering window 321 of another depth image. FIG. 4 exemplarily shows a pixel 43 and a pixel 44 in the filtering window 321 of another depth image.

In addition, the depth image filtering unit 103 may calculate a distance value (b) between each pixel of the reference depth image and each pixel of another depth image. In case of calculating the distance value (b) with respect to the pixel 41, a distance value may be calculated based on a location of another depth image, matched with the corresponding pixel 41 of the reference depth image. For example, the distance value from the pixel 41 to the pixel 43 may be calculated as a distance value from the pixel 42 to the pixel 43 as shown in FIG. 4. Similarly, the distance value from the pixel 41 to the pixel 44 may be calculated as a distance value from the pixel 42 to the pixel 44. Since the camera pose changing unit 102 aligns camera poses of the plurality of depth images into a single camera pose and the filtering windows are arranged regularly in the aligned camera pose as shown in FIG. 3, it may be understood that the pixel 41 and the pixel 42 are located at relatively identical coordinates with respect to each filtering window.

In an embodiment, the depth image filtering unit 103 may determine a difference value (c) of a camera pose with respect to the plurality of depth images based on the reference depth image. In detail, the depth image filtering unit 103 may determine a difference value of the camera pose by log-mapping the relative camera pose value as shown in Equation 4. In addition, the depth image filtering unit 103 may obtain the relative camera pose value by using an ICP algorithm. As a result, it may be understood that a depth image obtained at a pose more similar to the reference depth image has a greater weight.

Figure 5:
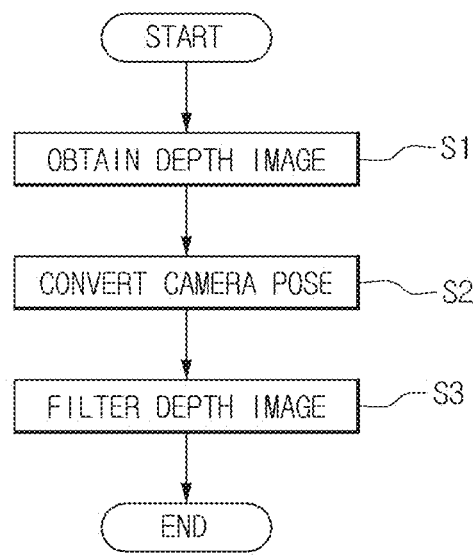
FIG. 5 is a flowchart for illustrating a depth image noise removal method based on a camera pose according to another embodiment of the present disclosure.

FIG. 5 is a flowchart for illustrating a depth image noise removal method based on a camera pose according to another embodiment of the present disclosure. The depth image noise removal method based on a camera pose according to this embodiment includes obtaining a plurality of depth images (S1), converting camera poses of the plurality of depth images into a camera pose of the reference depth image (S2), and filtering the reference depth image by using a weighted average of each pixel of the reference depth image (S3).

In an embodiment, Operation of obtaining a plurality of depth images (S1) may be performed with the same function as the depth image obtaining unit 101 described above or may be performed by the depth image obtaining unit 101. In addition, Operation of converting camera poses of the plurality of depth images into a camera pose of the reference depth image (S2) may include obtaining relative camera pose values of the plurality of depth images based on the reference depth image, and re-projecting the plurality of depth images to the reference depth image by calculating a re-projection matrix to the relative camera pose value.

In an embodiment, a method for determining a weighted average is identical to the above, and Operation of filtering the reference depth image (S3) may include successively generating a filtering window for a partial region of the reference depth image, and calculating the weighted average from the filtering window.

In other words, the noise removal method according to an embodiment of the present disclosure obtains n number of depth images including the reference depth image and its back and forth before, which are subject to noise removal, and calculates relative camera locations from the reference depth image, with respect to n−1 number of back and forth depth images, excluding the reference depth image. In addition, n−1 number of back and forth depth images may be re-projected to a camera location of the reference depth image, and n number of depth images converted as if being obtained at a single place are blended by means of the filtering method described above. The filtering method may also be called a Pose Aware Trilateral (PAT) filtering method.

Figure 6:
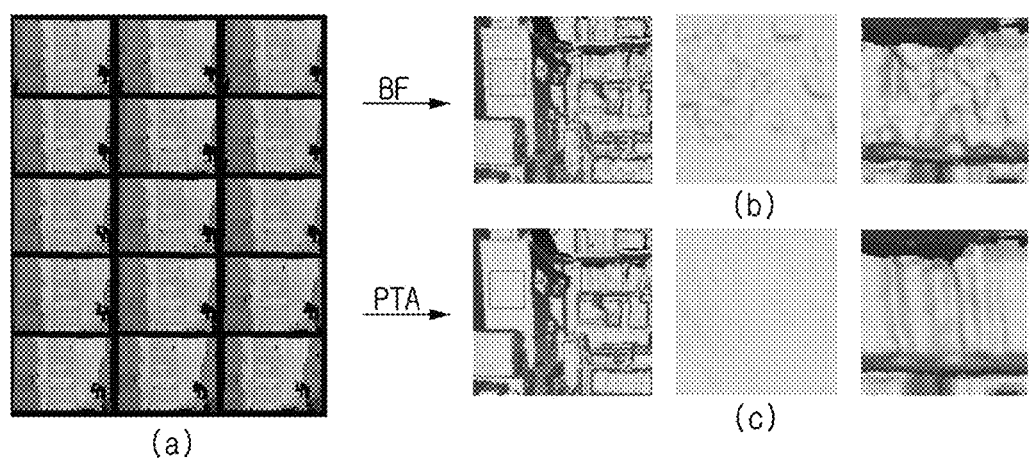
FIG. 6 is a diagram comparatively showing a result where a PAT filtering method according to an embodiment of the present disclosure is applied and a result where a bilateral filter is applied.

FIG. 6 is a diagram comparatively showing a result where a PAT filtering method according to an embodiment of the present disclosure is applied and a result where a bilateral filter is applied.

Referring to FIG. 6, it may be understood that more noise is removed in FIG. 6(*c*) depicting the resultant product of the PAT filtering according to an embodiment of the present disclosure, compared with FIG. 6(*b*) depicting the resultant product of a bilateral filter wherein FIG. 6(*a*) is diagram showing a image before the filtering.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

However, in the description, details of well-known features and techniques may be omitted to avoid unnecessarily obscuring the presented embodiments. In addition, the shape, size and regions, and the like, of the drawing may be exaggerated for clarity and may not mean the actual dimension.

The embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed in the computer may correspond to the term "unit", "module", "device", "system" or the like in the specification.

The embodiments have been described with reference to the flowchart shown in the figure. For brief explanation, the method has been illustrated and described as a series of blocks, but the present disclosure is not limited to the order of the blocks. In other words, some blocks may be executed simultaneously with other blocks or in a different order from those illustrated and described in this specification, and various diverges, flow paths, block sequences may also be implemented if they give the equivalent or similar results. In addition, in order to implement the method described in the specification, it is also possible not to demand all blocks. Further, the method for predicting a surgery stage may be implemented in the form of a computer program for executing a series of processes, and the computer program may also be recorded on a computer-readable recording medium.

Though the present disclosure has been described with reference to the embodiments depicted in the drawings, it is just an example, and it should be understood by those skilled in the art that various modifications and equivalents can be made from the disclosure. However, such modifications should be regarded as being within the scope of the present disclosure. Therefore, the true scope of the present disclosure should be defined by the appended claims.

What is claimed is:

1. A depth image noise removal apparatus based on a camera pose, comprising a computer storing and executing a computer readable program, the computer readable program comprising:
   a depth image obtaining unit configured to obtain depth images;
   a camera pose converting unit configured to convert camera poses of the depth images into a camera pose of a reference depth image; and
   a depth image filtering unit configured to filter the reference depth image by using a weighted average of each pixel of the reference depth image.

2. The depth image noise removal apparatus based on a camera pose according to claim 1,
   wherein the depth image filtering unit determines the weighted average based on
   a difference value of depth values and a distance value between each pixel of the reference depth image and each pixel of another depth image; and
   a difference value of camera poses for the depth images.

3. The depth image noise removal apparatus based on a camera pose according to claim 2,
   wherein the camera pose converting unit performs
   obtaining relative camera pose values of the depth images based on the reference depth image; and
   re-projecting the depth images to the reference depth image by calculating a re-projection matrix to the relative camera pose value.

4. The depth image noise removal apparatus based on a camera pose according to claim 3,
   wherein the camera pose converting unit obtains the relative camera pose value by using an ICP algorithm.

5. The depth image noise removal apparatus based on a camera pose according to claim 3,
   wherein the depth image filtering unit calculates a difference value of the camera pose by log-mapping the relative camera pose value.

6. The depth image noise removal apparatus based on a camera pose according to claim 2,
   wherein the depth image filtering unit performs
   successively generating a filtering window for a partial region of the reference depth image; and
   calculating the weighted average from the filtering window.

7. The depth image noise removal apparatus based on a camera pose according to claim 1, wherein the computer includes a camera capable of photographing depth images and building a database.

8. The depth image noise removal apparatus based on a camera pose according to claim 1, wherein the computer includes a combination of a color camera and depth camera.

9. The depth image noise removal apparatus based on a camera pose according to claim 8, wherein the depth camera has an infrared sensor.

10. The depth image noise removal apparatus based on a camera pose according to claim 1, wherein the computer comprises depth cameras.

11. The depth image noise removal apparatus based on a camera pose according to claim 10, wherein a depth camera has an infrared sensor.

12. A depth image noise removal method based on a camera pose, comprising:
    obtaining depth images;
    converting camera poses of the depth images into a camera pose of a reference depth image; and
    filtering the reference depth image by using a weighted average of each pixel of the reference depth image.

13. The depth image noise removal method based on a camera pose according to claim 12,
    wherein the weighted average is determined based on
    a difference value of depth values and a distance value between each pixel of the reference depth image and each pixel of another depth image; and
    a difference value of camera poses for the depth images.

14. The depth image noise removal method based on a camera pose according to claim 13,
    wherein said converting of camera poses of the depth images into a camera pose of a reference depth image includes
    obtaining relative camera pose values of the depth images based on the reference depth image; and
    re-projecting the depth images to the reference depth image by calculating a re-projection matrix to the relative camera pose value.

15. The depth image noise removal method based on a camera pose according to claim 14,
    wherein said obtaining of relative camera pose values obtains the relative camera pose value by using an ICP algorithm.

16. The depth image noise removal method based on a camera pose according to claim 14,
    wherein the difference value of the camera pose is calculated by log-mapping the relative camera pose value.

17. The depth image noise removal method based on a camera pose according to claim 13,
    wherein said filtering of the reference depth image includes successively generating a filtering window for a partial region of the reference depth image; and calculating the weighted average from the filtering window.

* * * * *